United States Patent
Bushell et al.

(10) Patent No.: US 9,013,666 B2
(45) Date of Patent: Apr. 21, 2015

(54) APPARATUS FOR AIRCRAFT DUAL CHANNEL DISPLAY

(71) Applicant: GE Aviation Systems Limited, Cheltenham (GB)

(72) Inventors: Mark Anthony Bushell, Cheltenham (GB); Brett Allen Eddy, Phoenix, AZ (US)

(73) Assignee: GE Aviation Systems Limited, Cheltenham (GB)

( * ) Notice: Subject to any disclaimer, the term of this patent is extended or adjusted under 35 U.S.C. 154(b) by 125 days.

(21) Appl. No.: 13/861,699

(22) Filed: Apr. 12, 2013

(65) Prior Publication Data

US 2014/0118623 A1 May 1, 2014

(30) Foreign Application Priority Data

Nov. 1, 2012 (GB) .................................. 1219666.3

(51) Int. Cl.
G02F 1/1343 (2006.01)
G09G 3/36 (2006.01)
H04N 5/268 (2006.01)
G09G 3/34 (2006.01)

(52) U.S. Cl.
CPC ................. H04N 5/268 (2013.01); G09G 3/36 (2013.01); G09G 3/342 (2013.01); G09G 3/3666 (2013.01); G09G 2300/0426 (2013.01); G09G 2300/0443 (2013.01); G09G 2330/02 (2013.01); G09G 2330/08 (2013.01); G09G 2380/12 (2013.01)

(58) Field of Classification Search
USPC ................ 349/149, 54, 192; 345/98–100, 204
See application file for complete search history.

(56) References Cited

U.S. PATENT DOCUMENTS

| 4,859,997 | A | * | 8/1989 | Bouron et al. ................. 345/59 |
| 5,631,754 | A | | 5/1997 | Jannson et al. |
| 5,668,569 | A | | 9/1997 | Greene et al. |
| 6,285,360 | B1 | | 9/2001 | Li |
| 6,977,666 | B1 | | 12/2005 | Hedrick |
| 7,724,259 | B2 | | 5/2010 | Hedrick et al. |
| 8,098,175 | B2 | | 1/2012 | Berthou et al. |
| 2002/0075248 | A1 | | 6/2002 | Morita et al. |
| 2005/0284984 | A1 | * | 12/2005 | De Lauzun et al. ........ 244/129.1 |
| 2007/0046680 | A1 | | 3/2007 | Hedrick et al. |
| 2008/0208399 | A1 | | 8/2008 | Pham |
| 2008/0284694 | A1 | | 11/2008 | Dunn |
| 2010/0090868 | A1 | | 4/2010 | Hall |

(Continued)

FOREIGN PATENT DOCUMENTS

EP 1783699 A2 5/2007
FR 2843646 A1 2/2004

(Continued)

OTHER PUBLICATIONS

Search Report and Written Opinion from FR Application No. 1260007 dated Aug. 23, 2013.

(Continued)

*Primary Examiner* — Michael Caley
(74) *Attorney, Agent, or Firm* — General Electric Company; William S. Munnerlyn

(57) ABSTRACT

An aircraft cockpit display includes among other things a display panel having a pixel matrix, a backlight for illuminating the matrix, a first video channel having a row driver and a column driver and a second video channel having a row driver and a column driver.

17 Claims, 5 Drawing Sheets

(56) References Cited

U.S. PATENT DOCUMENTS

| | | |
|---|---|---|
| 2010/0289963 A1 | 11/2010 | LeFort et al. |
| 2012/0062612 A1 | 3/2012 | Tanada et al. |
| 2012/0256768 A1 | 10/2012 | Kratchounova et al. |
| 2012/0280986 A1 | 11/2012 | Chabot et al. |
| 2013/0120664 A1 | 5/2013 | Bushell et al. |
| 2013/0250186 A1 | 9/2013 | Bushell et al. |
| 2013/0276037 A1 | 10/2013 | Bushell et al. |

FOREIGN PATENT DOCUMENTS

| | | |
|---|---|---|
| FR | 2974938 A1 | 11/2012 |
| GB | 2447967 A | 10/2008 |
| JP | 2007212956 A | 8/2007 |
| WO | 9853366 A1 | 11/1998 |
| WO | 2008009955 A1 | 1/2008 |

OTHER PUBLICATIONS

Search Report for corresponding GB Application No. 1119482.6, dated Feb. 13, 2012.

Search Report from corresponding GB Application No. 1204840.1, Jun. 28, 2012.

David Allen: "Electronic Flight Bag (EFB)" Internet Citation Oct. 10, 2006, pp. 1-17, XP002496643 Internet Extract URL: http://web.archive.org/web/20061010202846/http://www.boeing.com/commercial/aeromagazine/aero_23/EFB_story.html (extracted on Sep. 22, 2008) the whole document.

Search Report from corresponding GB Application No. 1206654.4, Aug. 14, 2012.

Search Report for corresponding FR1352189, dated Feb. 6, 2014.

Search Report and Written Opinion from GB Application No. 1219666.3 dated Feb. 20, 2013.

\* cited by examiner

US 9,013,666 B2

APPARATUS FOR AIRCRAFT DUAL CHANNEL DISPLAY

CROSS-REFERENCE TO RELATED APPLICATIONS

This application claims priority under 35 U.S.C. §119 to British Patent Application No. 12196663, filed Nov. 1, 2012, the disclosure of which is incorporated herein by reference.

BACKGROUND OF THE INVENTION

Contemporary aircraft cockpits include a flight deck having multiple flight displays, which display to the flight crew a wide range of aircraft, flight, navigation, and other information used in the operation and control of the aircraft. Within the aviation industry there is a trend towards using large widescreen format displays within the cockpit. This brings the advantage of providing a larger configurable display surface to provide more information to the flight crew and offers the ability to tailor display formats and information displayed. Because all primary flight information may be displayed on the single display surface instead of a plurality of displays or instruments the loss of the single display surface will be far more severe than with the traditional approach.

BRIEF DESCRIPTION OF THE INVENTION

In one embodiment, the invention relates to an aircraft cockpit display comprising a display panel having a matrix of pixels arranged in rows and columns and forming a display area, a backlight for illuminating the matrix, a first video channel having a row driver and a column driver for driving a first portion of the pixels, and a second video channel having a row driver and a column driver for driving a second portion of the pixels, wherein the column drivers of the first video channel drive the columns within a first portion of the display panel, the column drivers of the second video channel drive the columns within a second portion of the display panel, and the row drivers of the first and second video channels drive rows that are interleaved with each other in the display panel, and the first and second video channels are independent.

DESCRIPTION OF EMBODIMENTS OF THE INVENTION

Figure 1:
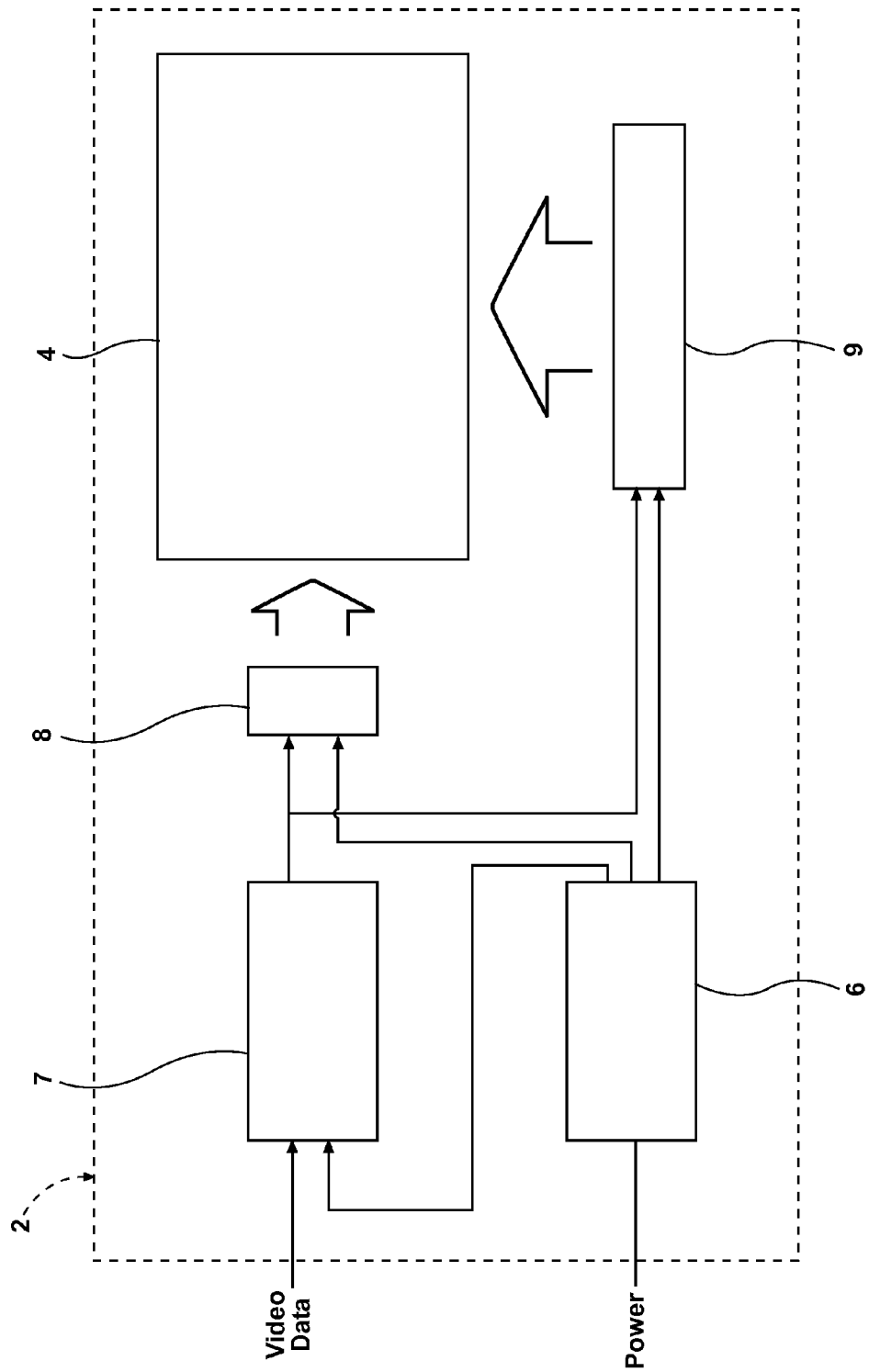
FIG. 1 is a schematic view of a prior design flight display module.

FIG. 1 illustrates a prior design flight display module 2. The flight display module 2 includes a display panel 4, which may be a widescreen LCD display panel, and associated power and control electronics including power circuitry 6, timing controls 7, and display drivers in the form of row and column display drivers 8 and 9. Power and video data are fed into the flight display module 2 and any failure within the prior design flight display module 2, whether with the power circuitry 6, timing controls 7, or display drivers 8 and 9, would adversely affect the ability of the flight display module 2 to display uncorrupted video data on the display panel 4. The corruption could manifest itself as either partial or full screen video corruption on the LCD panel. When the display is a widescreen display, the effect of the loss of such a large area display is significantly more acute than the loss of a single mechanical instrument or loss of smaller electronic flight instrument displays on conventionally equipped aircrafts.

Figure 2:
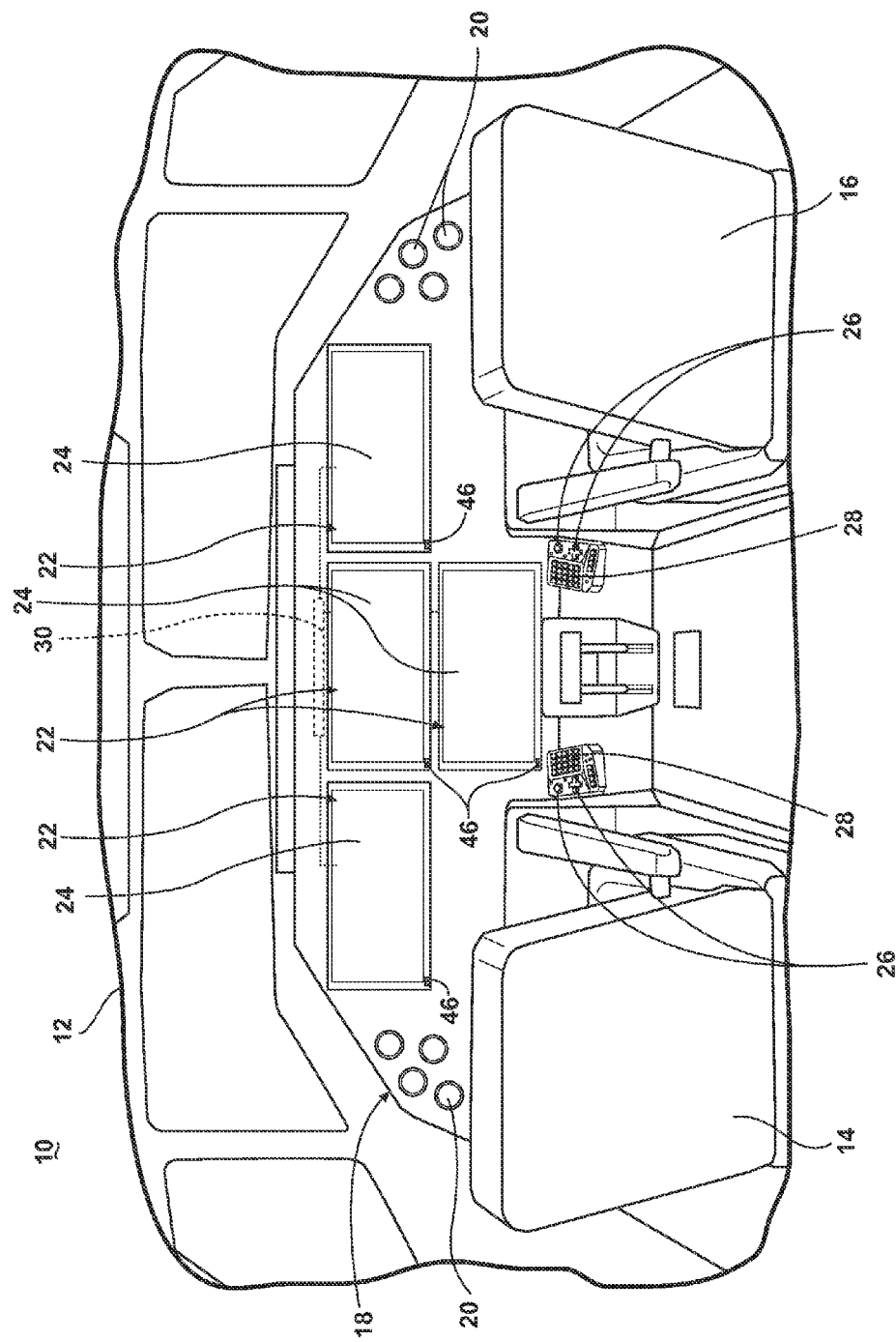
FIG. 2 is a perspective view of a portion of an aircraft cockpit having multiple flight display modules according to an embodiment of the invention.

The below described inventive embodiments ensure that the flight display module has high availability and that any single failure, excluding that of the LCD panel itself, has no impact on the primary display functions. FIG. 2 illustrates a portion of an aircraft 10 having a cockpit 12 according to one embodiment of the invention. While a commercial aircraft has been illustrated, it is contemplated that the embodiments of the invention may be used in any type of aircraft, for example, without limitation, fixed-wing, rotating-wing, rocket, personal aircraft, and military aircraft. A first user (e.g., a pilot) may be present in a seat 14 at the left side of the cockpit 12 and another user (e.g., a co-pilot) may be present at the right side of the cockpit 12 in a seat 16. A flight deck 18 having various instruments 20 and multiple flight display modules 22 may be located in front of the pilot and co-pilot and may provide the flight crew with information to aid in flying the aircraft 10. The flight display modules 22 may include either primary flight displays or multi-function displays and may display a wide range of aircraft, flight, navigation, systems, and other information used in the operation and control of the aircraft 10. The flight display modules 22 have been illustrated as being in a spaced, side-by-side arrangement with each other. The flight display modules 22 may be laid out in any manner including having fewer or more displays. Further, the flight display modules 22 need not be coplanar and need not be the same size. A display panel 24 on which the display representation may be provided may be included in the flight display modules 22. This display panel may include any display panel having a matrix of individually controllable pixels, such as LCD and LED. By way of non-limiting example the display panel 24 may be a flat Active Matrix Liquid Crystal Display (AMLCD) panel.

It is contemplated that one or more cursor control devices 26 and one or more multifunction keyboards 28 may be included in the cockpit 12 and may also be used by one or more flight crew members to interact with the systems of the aircraft 10. A suitable cursor control device 26 may include any device suitable to accept input from a user and to convert that input to a graphical position on any of the multiple flight display modules 22. Various joysticks, multi-way rocker switches, mice, trackballs, and the like are suitable for this purpose and each user may have separate cursor control device(s) 26 and keyboard(s) 28.

A controller 30 may be operably coupled to components of the aircraft 10 including the flight display modules 22, cursor control devices 26, and keyboards 28. The controller 30 may also be connected with other controllers (not shown) of the aircraft 10. The controller 30 may include memory and processing units, which may be running any suitable programs to operate the aircraft 10. The controller 30 may also receive inputs from one or more other additional sensors (not shown), which may provide the controller 30 with various information to aid in the operation of the aircraft 10.

Figure 3:
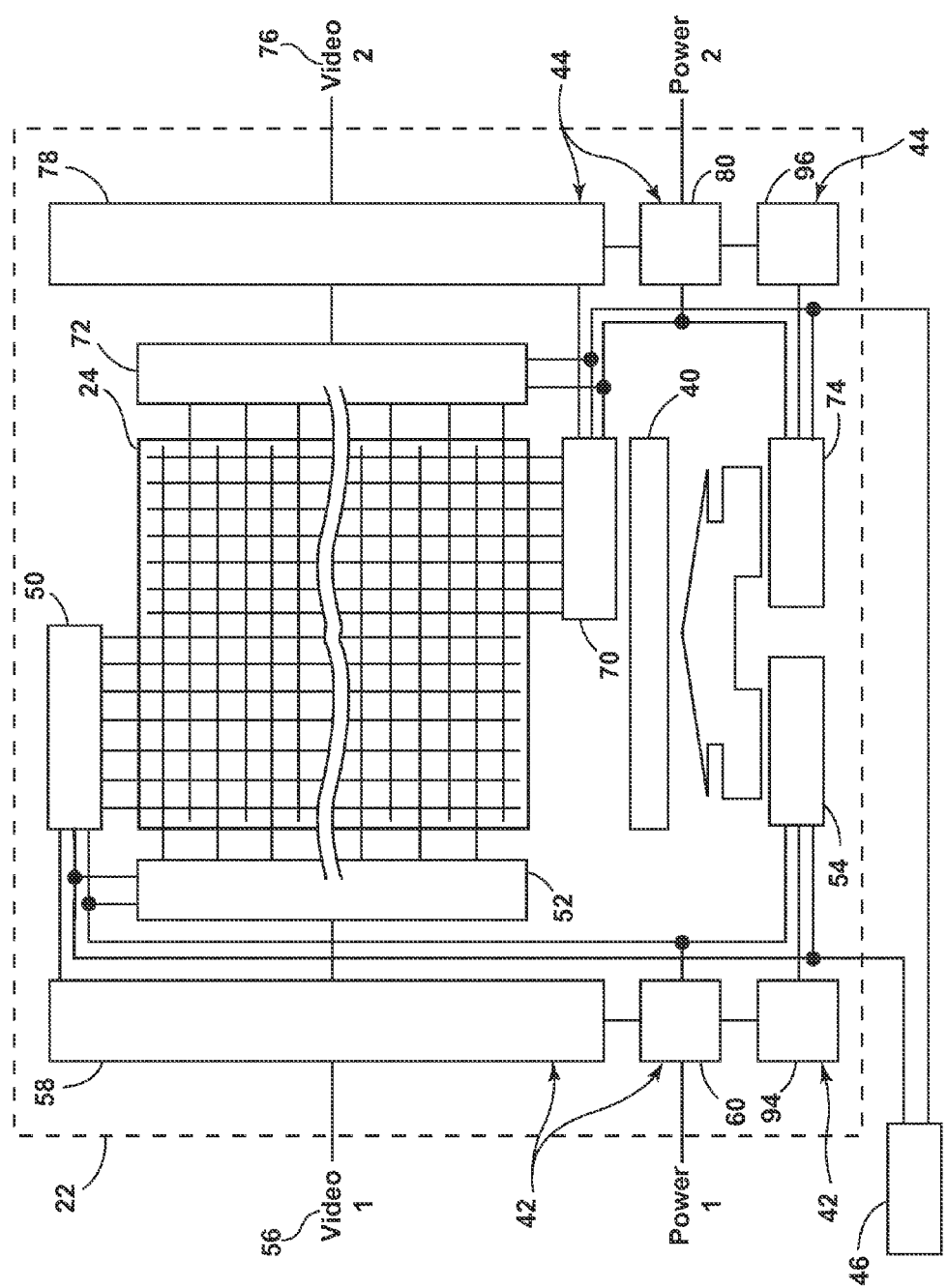
FIG. 3 is a schematic view of one of the flight display modules of the aircraft cockpit of FIG. 2.

FIG. 3 illustrates a schematic embodiment of the flight display module 22. The display panel 24, a backlight assembly 40 such as a light emitting diode (LED) backlight assembly, a first channel 42 consisting of a power source 60, timing controller 58, backlight controller 94, column driver 50, row driver 52, and LED backlight driver 54, and a second channel 44 consisting of a power source 80, timing controller 78, backlight controller 96, column driver 70, row driver 72, and LED backlight driver 74 are illustrated as being included in the flight display module 22. A switch 46 is illustrated as being operably coupled to the flight display module 22.

The display panel 24 may include a liquid crystal matrix (not shown) with an array of pixels 25 arranged in columns and rows, where each pixel 25 consists of multiple color groups, and where each color group consists of multiple subpixels, and each subpixel is addressable by rows and columns and programmed by their associated row and column drivers. For example, one half of the color groups of the pixels 25 may be driven by one set of the electronics of the first channel 42 and the other half of the color groups of the pixels 25 may be driven by the electronics of the independent second channel 44. Such a display panel 24 may include a horizontal dimension of 13.2 inches (335 mm), a vertical dimension of 7.9 inches (201 mm), that is, an aspect ratio of 16:9 and a diagonal dimension of 15.3 inches (389 mm) It will be appreciated that different size screens could be used and that the aspect ratio could be changed from the wide screen format mentioned above. Further, the display panel 24 may include a higher density display having an increased number of pixels 25.

The LED backlight assembly 40 may be mounted behind the display panel 24 and may include an array of LEDs (not shown). Such LED arrays reproduce color better and consume less electricity then cathode fluorescent lamps. The array of LEDs in the LED backlight assembly 40 may be mounted on a printed circuit board (not shown) to give sufficient light to illuminate the liquid crystal matrix of the display panel 24. The LED backlight assembly 40 may be configured with multiple LED strings to ensure the display panel 24 may be sufficiently illuminated as a result of a failure within the LED backlight assembly 40.

First channel 42 and second channel 44 are two identical and independent video channels capable of displaying a video signal on the LCD panel. The first channel 42 is illustrated as including column drivers 50, row drivers 52, LED drivers 54, a timing controller 58, backlight controller 94, and a power source 60. The second channel 44 is illustrated as including column drivers 70, row drivers 72, LED drivers 74, a timing controller 78, backlight controller 96, and a power source 80.

The column drivers 50 and 70 and row drivers 52 and 72 of the first and second channels 42 and 44, respectively, are operably coupled to the columns and rows in the liquid crystal matrix of the display panel 24 and drive electrically isolated, interleaved color groups within the pixels 25 (FIGS. 4A through 4D). The row drivers 52 are illustrated as driving odd rows and the row drivers 72 are illustrated as driving even rows. In this manner, the first video channel 42 drives a first portion of the pixels 25 and the second video channel 44 drives a second portion of the pixels 25 where the first portion of the pixels 25 has rows that are interleaved with rows of the second portion of the pixels 25. The column drivers 50 are illustrated as driving the left half of the display panel 24 while the column drivers 70 are illustrated as driving the right half of the display panel 24. Further, the first video channel 42 drives the columns of one portion of the liquid crystal matrix and the second video channel 44 drives the columns of another portion of the liquid crystal matrix. It will be understood that the portion driven by the first video channel 42 and the other portion driven by the second video channel 44 need not be one half of the display panel 24.

The LED backlight drivers 54 and 74 are operably coupled to the array of LEDs of the LED backlight assembly 40 to control the LED backlight assembly 40 to illuminate the liquid crystal matrix of the display panel 24. Each of the LED backlight drivers 54 and 74 are capable of selectively driving the array of LEDs of the LED backlight assembly 40.

The timing controller 58 of the first channel 42 is operably coupled to the column drivers 50 and row drivers 52. The timing controller 58 is capable of outputting control signals to the column driver 50 and row driver 52. The timing controller 78 of the second channel 44 is operably coupled to the column drivers 70 and row drivers 72. The timing controller 78 is capable of outputting control signals to the column drivers 70 and row drivers 72.

The backlight controller 94 of the first channel 42 is operably coupled to the LED backlight driver 54. The backlight controller 94 is capable of outputting control signals to the LED backlight driver 54. The backlight controller 96 of the second channel 44 is operably coupled to the LED backlight driver 74. The backlight controller 96 is capable of outputting control signals to the LED backlight driver 74. It is contemplated that the timing controller and backlight controller of each of the first and second independent video channels 42 and 44 may be implemented separately or may be implemented within a single device.

A first power input or power source 60 is included in the first channel 42 and supplies power to the components of the first channel 42. A second power input or power source 80 is included in the second channel 44 and supplies power to the components of the second channel 44.

The switch 46 provides for deselecting either the first or second independent video channels 42 and 44 after a failure therein. The switch 46 may be a manual switch that is located within reach of a pilot and/or co-pilot within the cockpit 12. The switch 46 may be integrated with the flight display module 22. For example, the switch has been illustrated as being externally mounted to the flight display module 22.

It is contemplated that the switch 46 may be a multiple position manual switch that deselects either the first channel 42 or the second channel 44 or allows both channels 42 and 44 to be active. It is contemplated that the manual switch 46 could also include an auto switch position. When the auto switch position is selected, an arbiter module (not shown) within the flight display module 22 may monitor the health of each function within each of the first and second independent video channels 42 and 44 that affects the integrity of the video data stream. In the event a fault is detected, the defective channel would be automatically deselected.

While the switch 46 has been illustrated and described as a manual switch, it is contemplated that the switch 46 may be entirely automatic. Such an automatic switch may be included within the flight display module 22. The automatic switch may be capable of deselecting one of the first and second independent video channels 42 and 44 in response to a failure in one of the first and second independent video channels 42 and 44. Such an automatic switch mechanism may be duplicated within the flight display module 22.

The above described embodiment may be capable of operating with both first and second independent video channels 42 and 44 active. The above described embodiment may also be capable of operating in a half screen mode of operation following a failure of one of the two channels. The above described embodiment may also be capable of operating in a full screen mode of operation following a failure of the row driver 52 or the row driver 72 because of the interleaved rows.

In FIGS. 4A through 4D the pixels are schematically illustrated as being arranged in columns and rows and each pixel 25 includes multiple color groups and each color group contains multiple subpixels of varying colors. More specifically, a subpixel includes a single color element such as a green stripe. For purposes of this specification, a color group includes a group of three subpixels with one red subpixel, one green subpixel, and one blue subpixel. It is contemplated that the pixels 25 may be interleaved, either at the color group level (RGB) or at the subpixel level (R, G, or B), such that the entire display panel 24 may be usable for graphics following a failure of the row driver 52 or the row driver 72.

Figures 4A, 4B:
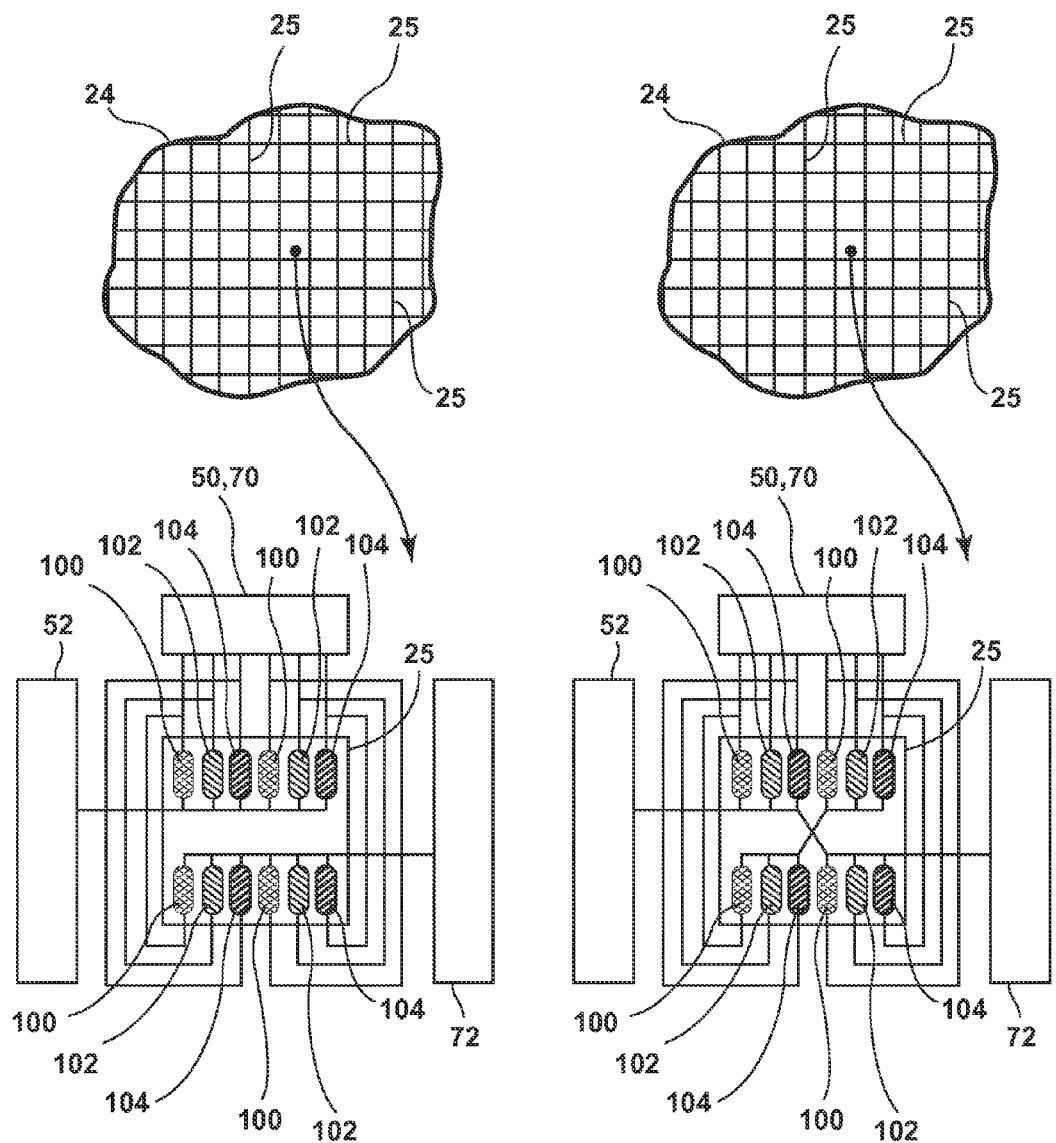
FIGS. 4A through FIG. 4D provide schematic views of pixel and subpixel arrangements that may be used in the flight display of FIG. 3.
Figure 4C:
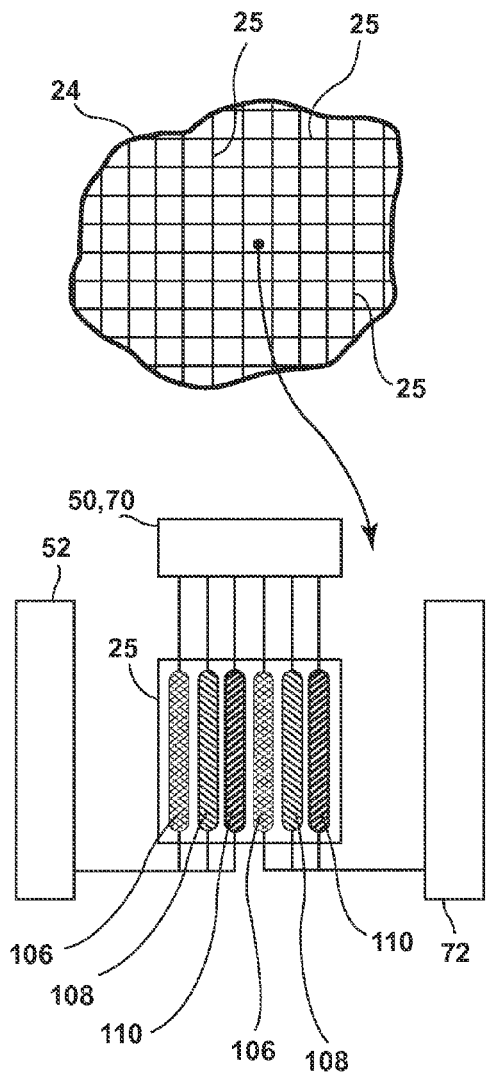
Figure 4D:
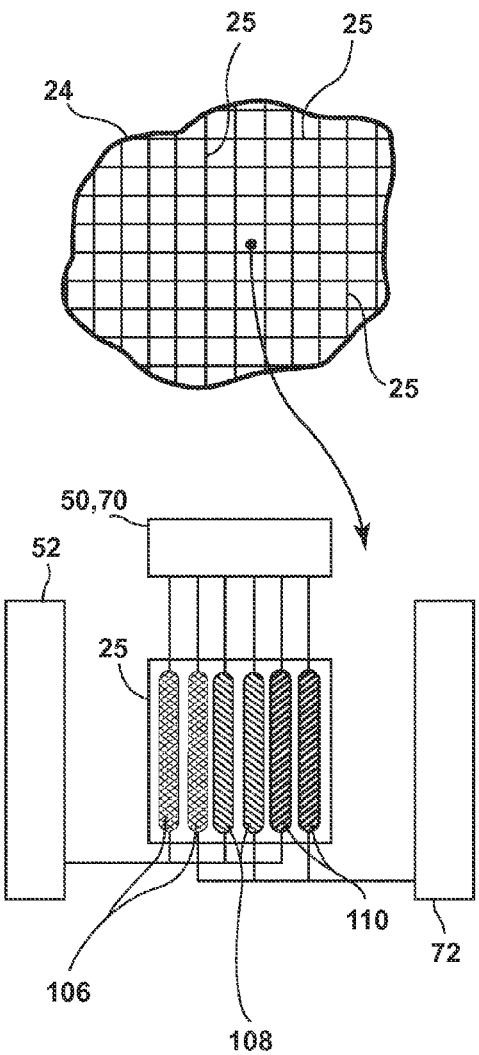

By way of non-limiting examples, the subpixels within each pixel 25 are illustrated as being arranged in various manners in the schematic illustrations shown in FIG. 4A, FIG. 4B, FIG. 4C, and FIG. 4D. In FIGS. 4A and 4B the pixels 25 include four color groups. In FIGS. 4C and 4D the pixels 25 include two color groups. It will be understood that these are for exemplary purposes only and that any suitable number of color groups may be included in each pixel and any number of subpixels may be included in each color group.

In FIGS. 4A and 4B it may be seen that each pixel 25 includes four color groups and each color group includes three subpixel stripes, which are typically red subpixel stripes 100, green subpixel stripes 102, and blue subpixel stripes 104, and may be arranged in sections with color groups in each section driven by the same channel. While the examples describe the subpixels as including subpixel stripes the subpixels may have alternative shapes including that of a dot. In FIG. 4A the color groups are grouped by row and in FIG. 4B the color groups are cross-hatched. For example, in FIG. 4A the color group consisting of red subpixel stripes 100, green subpixel stripes 102, and blue subpixel stripes 104 in the upper portion may be driven by the row driver 52 of the first channel 42 and the color group consisting of red subpixel stripes 100, green subpixel stripes 102, and blue subpixel stripes 104 in the lower portion may be driven by the row driver 72 of the second channel 44. In FIG. 4B the color group consisting of red subpixel stripes 100, green subpixel stripes 102, and blue subpixel stripes 104 in an upper left portion and a lower right portion may be driven by the row driver 52 of the first channel 42 and the color group consisting of red subpixel stripes 100, green subpixel stripes 102, and blue subpixel stripes 104 in an upper right portion and a lower left portion may be driven by the row driver 72 of the second channel 44. In the above Figures, following a failure of the row driver 52 or the row driver 72, various color groups may still be driven to provide the benefit of an even distribution of active subpixels across the display panel 24.

In FIG. 4C and FIG. 4D, each pixel 25 includes two color groups and each color group consists of subpixel stripes which are longer than those illustrated in the previous figures and may typically include red subpixel stripes 106, green subpixel stripes 108, and blue subpixel stripes 110. The subpixel stripes 106-110 may be arranged by the driving row driver such as red subpixel stripe 106, green subpixel stripe 108, blue subpixel stripe 110, red subpixel stripe 106, green subpixel stripe 108, and blue subpixel stripe 110 such as shown in FIG. 4C. Alternatively, the subpixel stripes 106-110 may be arranged by color such as red subpixel stripe 106, red subpixel stripe 106, green subpixel stripe 108, green subpixel stripe 108, blue subpixel stripe 110, and blue subpixel stripe 110 such as shown in FIG. 4D. The arrangement of FIG. 4D provides the benefit of minimal image displacement following a failure of the row driver 52 or the row driver 72. In both FIG. 4C and FIG. 4D the color group consisting of the first red subpixel stripe 106, first green subpixel stripe 108, and first blue subpixel stripe 110 may be driven by the row driver 52 of the first channel 42 and the color group consisting of the second red subpixel stripe 106, second green subpixel stripe 108, and second blue subpixel stripe 110 of each color group may be driven by the row driver 72 of the second channel 44.

It will be understood that in FIGS. 4A, 4B, 4C, and 4D, the column driver for the entire pixel 25 may be the column driver 50 of the first video channel 44 if the pixel 25 is in the first portion of the display panel 24 and the column driver for the entire pixel 25 may be the column driver 70 of the second video channel 44 if the pixel 25 is in the second portion of the display panel 24. In the illustrated embodiment, failure of the column driver 50 or other electronics, aside from the row driver 52, in the first video channel 42 would result in a loss of a first portion of the display panel 24 corresponding in the illustrated example to the left half of the display panel 24 and failure of the column driver 70 or other electronics, aside from the row driver 72, in the second video channel 44 would result in a loss of a second portion of the display panel 24 corresponding in the illustrated example to the right half of the display panel 24. In FIGS. 4A, 4B, 4C, and 4D, following a failure of the row driver 52 or the row driver 72, various color groups may still be driven to provide the benefit of an even distribution of active subpixels across the display panel 24.

It will be understood that the above Figures are merely examples and that the color groups and subpixels and the corresponding driving channels may be arranged in a variety of ways. For example, while the subpixels in the examples have been arranged by color, RGB, and the wiring is adjusted as need be to connect the subpixels with the appropriate channel, it is also contemplated that the subpixels may be arranged differently to accomplish the same purpose. It will be understood that the drivers operate the same no matter how the color groups and subpixels are arranged within the pixel 25. Each pixel 25 is driven by a single column driver and both row drivers 52 and 72 and each of the two channels drives its portion of the pixel 25 as if it is a single pixel. For FIGS. 4A and 4B, each row driver connects to two color groups within a pixel 25 as the two color groups are connected in parallel and treated as one pixel. In FIGS. 4C and 4D each row driver connects to only one color group.

During normal operation, both the first channel 42 and the second channel 44 may be operated simultaneously to provide full display graphics to the display panel 24 at any time. A full screen image is provided by both sets of driver electronics and both the first channel 42 and second channel 44 may be active at the same time when both channels are operational. When both channels 42 and 44 operate at the same time they will be synchronized to drive the exact same image at the exact same time such that all color groups within a pixel 25 would be driven the same way at the same time.

A single electronics failure within one of the two channels, aside from the row drivers, may result in failure of a portion of the display panel 24 while maintaining functionality of a portion of the display panel. In such an instance, the channel may be disabled and the remaining channel may maintain operation of the left or right half of the display panel 24. Furthermore, a failure of the row driver within one of the channels may result in the brightness of the display being reduced by half. To compensate for this, the backlight intensity may be increased. It will be understood that each subpixel or portion of the pixel may not be discernible to the naked eye and thus the visual quality may not be affected by such a failure. If each subpixel or portion of the pixel were discernible to the naked eye, then failure of one of the channels may result in degraded quality.

The failed channel may be deselected as an inactive channel and may be disabled. By way of non-limiting example, the source of power may be interrupted to the deselected channel.

Alternatively or in addition to the source of power being interrupted the drivers of the deselected or inactive channel may be set to an open or tri-state condition to prevent corruption of the active channel. Such deselecting may be carried out manually, such as by the pilot or co-pilot changing the setting of the switch 46. Alternatively, the deselection could be carried out by an automatic switch in response to fault detection processing built into the flight display module 22. By way of non-limiting example, there may be a display monitor that performs error detection processing to determine whether any of the graphical information, i.e., textual information, graphic symbols and charts, is erroneous.

The above described embodiments allow for multiple benefits. For example, the above described embodiments ensure that the flight display module may be operated if any single failure, excluding the LCD panel itself, occurs. In a failed mode as described above at least a portion of the display panel remains functional. The pixel arrangement may impact the legibility and brightness of the display panel. The arrangement of the pixels as described above allows for the display panel to be operated without disproportionate bands of color, without curved lines, and without jagged lines when a failure occurs. This minimizes the impact of the failure and may make the color blend more evenly across the display panel. Such enhanced system availability is vital given that a failure of such a flight display would result in the total loss of primary flying instruments on one side of the cockpit. The above described embodiments restrict the number of single point failures that may cause loss of display on the flight display module. The only remaining single channel device in the flight display module is the LCD itself, but the vast majority of failures result in loss of a single pixel or a single row or column of pixels, which has minimal impact on readability of the display, rather than the total loss of the LCD. Individual LEDs of the backlight may also fail, but will have minimal impact on backlight uniformity and readability of the display. The availability of the flight display to operate after a failure also allows for a reduction or elimination in maintenance delays due to electronic flight instrument system related problems associated with the display.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An aircraft cockpit display comprising:
   a display panel having a matrix of pixels arranged in rows and columns and forming a display area having a first left portion having multiple columns and a second right portion having multiple columns parallel to the first left portion;
   a backlight for illuminating the matrix;
   a first video channel having a row driver and a column driver for driving a first portion of the pixels; and
   a second video channel having a row driver and a column driver for driving a second portion of the pixels;
   wherein the column drivers of the first video channel drives all of the columns within the first left portion of the display panel, the column driver of the second video channel drives all of the columns within the second right portion of the display panel, and the row drivers of the first and second video channels drive rows that are interleaved with each other in both the first left portion and the second right portion of the display panel, and the first and second video channels are independent.

2. The aircraft cockpit display of claim 1, further comprising a switch for deselecting the first and second independent video channels.

3. The aircraft cockpit display of claim 2 wherein the switch is an automatic switch.

4. The aircraft cockpit display of claim 3 wherein the automatic switch deselects one of the first and second independent video channels in response to a failure in one of the first and second independent video channels.

5. The aircraft cockpit display of claim 2 wherein the switch is a manual switch.

6. The aircraft cockpit display of claim 5 wherein the manual switch is located within reach of a pilot in the cockpit.

7. The aircraft cockpit display of claim 6 wherein the manual switch is integrated with the display.

8. The aircraft cockpit display of claim 2 wherein each of the first and second independent video channels further comprise independent sources of power.

9. The aircraft cockpit display of claim 8 wherein when a channel is deselected through the switch the source of power may be interrupted to that channel.

10. The aircraft cockpit display of claim 1 wherein each of the first and second independent video channels further comprises a timing controller.

11. The aircraft cockpit display of claim 10 wherein each of the first and second independent video channels further comprises a backlight controller operably coupled to a backlight driver.

12. The aircraft cockpit display of claim 11 wherein the timing controller and the backlight controller of at least one of the first and second independent video channels are implemented within a single device.

13. The aircraft cockpit of claim 1 wherein the first and second video channels are configured to operate the first and second portions of the pixels in parallel.

14. The aircraft cockpit display of claim 13 wherein when one row driver fails the display has half a normal brightness.

15. The aircraft cockpit display of claim 1 wherein each pixel in the matrix includes an arrangement of color groups and each color group consists of subpixels having differing colors and the color groups form first and second portions of the pixel.

16. The aircraft cockpit display of claim 15 wherein the subpixels are arranged by color.

17. The aircraft cockpit display of claim 15 wherein the subpixels are arranged by channel.

* * * * *

UNITED STATES PATENT AND TRADEMARK OFFICE
CERTIFICATE OF CORRECTION

| | | |
|---|---|---|
| PATENT NO. | : 9,013,666 B2 | Page 1 of 1 |
| APPLICATION NO. | : 13/861699 | |
| DATED | : April 21, 2015 | |
| INVENTOR(S) | : Bushell et al. | |

It is certified that error appears in the above-identified patent and that said Letters Patent is hereby corrected as shown below:

In the Specification

In Column 3, Line 22, delete "(389 mm)" and insert -- (389 mm). --, therefor.

In the Claims

In Column 8, Line 5, in Claim 1, delete "drivers" and insert -- driver --, therefor.

In Column 8, Line 46, in Claim 13, delete "cockpit of" and insert -- cockpit display of --, therefor.

Signed and Sealed this
Fifteenth Day of December, 2015

Michelle K. Lee
*Director of the United States Patent and Trademark Office*